United States Patent
Weippert et al.

(10) Patent No.: US 9,733,153 B2
(45) Date of Patent: Aug. 15, 2017

(54) DEVICE FOR MEASURING FORCE IN THE ROLLING BEARING BY MEANS OF A SENSOR LAYER

(71) Applicant: Schaeffler Technologies AG & Co. KG, Herzogenaurach (DE)

(72) Inventors: Ralf Weippert, Bergrheinfeld (DE); Jens Heim, Bergrheinfeld (DE); Jurgen Gierl, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/033,222

(22) PCT Filed: Oct. 10, 2014

(86) PCT No.: PCT/DE2014/200544
§ 371 (c)(1),
(2) Date: Apr. 29, 2016

(87) PCT Pub. No.: WO2015/062600
PCT Pub. Date: May 7, 2015

(65) Prior Publication Data
US 2016/0282222 A1 Sep. 29, 2016

(30) Foreign Application Priority Data
Oct. 31, 2013 (DE) .................. 10 2013 222 151

(51) Int. Cl.
*G01M 13/04* (2006.01)
*G01L 1/22* (2006.01)
(Continued)

(52) U.S. Cl.
CPC ............ *G01M 13/04* (2013.01); *F16C 19/522* (2013.01); *F16C 41/00* (2013.01); *G01L 1/2231* (2013.01); *G01L 5/009* (2013.01); *G01L 5/0023* (2013.01); *F16C 19/06* (2013.01); *F16C 19/30* (2013.01); *F16C 2300/02* (2013.01)

(58) Field of Classification Search
CPC ........ F16C 19/06; F16C 19/522; F16C 41/00; F16C 19/30; F16C 2300/02; G01P 3/443; G01M 13/04; G01L 1/2231; G01L 5/0023; G01L 5/009
USPC ........ 384/448, 548, 560, 572; 324/174, 178, 324/207.25; 340/547, 682
See application file for complete search history.

(56) References Cited

U.S. PATENT DOCUMENTS

| | | | | |
|---|---|---|---|---|
| 4,203,319 A | * | 5/1980 | Lechler | B23Q 17/09 73/862.49 |
| 6,109,624 A | * | 8/2000 | Message | F16C 13/006 280/11.223 |

(Continued)

FOREIGN PATENT DOCUMENTS

| | | |
|---|---|---|
| DE | 10136438 | 3/2002 |
| DE | 10250340 | 5/2004 |

(Continued)

*Primary Examiner* — Marcus Charles
(74) *Attorney, Agent, or Firm* — Volpe and Koenig, P.C.

(57) ABSTRACT

A measurement bearing is provided. The measurement bearing has a rolling bearing, at least one force-introducing ring and a space for at least one sensor layer, the space being surrounded by the at least one force-introducing ring and at least one other adjacent component of the measurement bearing.

2 Claims, 5 Drawing Sheets

(51) Int. Cl.
    *F16C 41/00*     (2006.01)
    *F16C 19/30*     (2006.01)
    *F16C 19/52*     (2006.01)
    *G01L 5/00*     (2006.01)
    *F16C 19/06*     (2006.01)

(56) References Cited

U.S. PATENT DOCUMENTS

| | | | | |
|---|---|---|---|---|
| 6,400,136 | B1 * | 6/2002 | Grehn | G01P 3/443 |
| | | | | 324/174 |
| 7,659,818 | B2 * | 2/2010 | Ueno | F16C 19/184 |
| | | | | 235/375 |
| 2003/0030565 | A1 * | 2/2003 | Sakatani | G01H 1/003 |
| | | | | 340/679 |
| 2007/0177162 | A1 * | 8/2007 | Glueck | F16C 19/522 |
| | | | | 356/621 |
| 2015/0030273 | A1 | 1/2015 | Sebald et al. | |

FOREIGN PATENT DOCUMENTS

| | | | | | |
|---|---|---|---|---|---|
| EP | | 1203960 | A2 * | 5/2002 | ............ F16C 19/525 |
| JP | | 2997589 | B2 * | 1/2000 | ............ F16C 19/525 |
| JP | | 2011149532 | A * | 8/2011 | ............. F16C 25/06 |
| JP | | 5061546 | B2 * | 10/2012 | |
| JP | | 5638312 | B2 * | 12/2014 | |
| WO | WO-2007122922 | A1 * | 11/2007 | | |
| WO | WO-2010054888 | A1 * | 5/2010 | | ............. B60B 27/02 |
| WO | | 2013135497 | | 9/2013 | |

\* cited by examiner

DEVICE FOR MEASURING FORCE IN THE ROLLING BEARING BY MEANS OF A SENSOR LAYER

CROSS REFERENCE TO RELATED APPLICATIONS

This application claims the benefit of German Patent Application No. DE 10 2013 222 151.7, filed Oct. 31, 2013, and PCT Application No. PCT/DE2014/200544, filed Oct. 10, 2014.

FIELD OF THE INVENTION

The invention relates to a device for measuring force in the rolling bearing by means of a sensor layer or a measurement bearing.

BACKGROUND OF THE INVENTION

From the prior art, a plurality of possibilities for measuring force in rolling bearings is known. Here, strain gauges are usually used that are applied on the corresponding components. It is further known to implement a sensor unit with the help of coatings for detecting elongation. Here, the strain gauges are usually attached to a component in an open and unprotected manner. The layers are structured by means of different processes. It is further known to apply the coatings to rings or plates in the rolling bearing, in order to determine forces acting on the bearing by means of elongation. To achieve the necessary sensitivity here, the components are weakened at the point to be measured by the provision of recesses, notches, or grooves.

A disadvantage in the prior art is that the strain gauges do not have long-term stability and recalibration is required. For optimum force measurement on a component, the layers must be applied at weak points, such as recesses, notches, or grooves, which makes the processing step providing the coating and the actual application more difficult. Furthermore, for applying the layers, an increased effort must be applied in order not to damage the raceway of the rolling bodies.

SUMMARY OF THE INVENTION

This creates the technical problem of providing a measurement bearing that overcomes the disadvantages from the prior art and that is also in the position, in addition to its ability to transmit loads, to determine the applied loads, without requiring additional maintenance on the measurement bearing.

The objective is achieved according to the invention by a measurement bearing, wherein the measurement bearing has a rolling bearing, at least one force introducing ring and an installation space for at least one sensor layer, wherein the installation space is surrounded by the at least one force introducing ring and at least one additional adjacent component of the measurement bearing,
wherein the rolling bearing has a rolling bearing cage, an outer ring, and an inner ring, wherein the rolling bearing cage with rolling bodies is arranged between the two rings, wherein the outer ring or the inner ring is provided as the at least one additional component of the measurement bearing, wherein
either the force introducing ring is arranged along the inner lateral surface of the inner ring, wherein the installation space is surrounded by the force introducing ring and the inner ring and at least one sensor layer is arranged on the inner ring or
on the force introducing ring,
or the force introducing ring is arranged along the outer lateral surface of the outer ring, wherein the installation space is surrounded by the force introducing ring and the outer ring and at least one sensor layer is arranged on the outer ring or the force introducing ring, and
wherein an additional force introducing ring is arranged along a side edge of the outer ring, wherein an additional installation space is surrounded by the additional force introducing ring and the side edge of the outer ring and at least one additional sensor layer is arranged on the side edge of the outer ring or on the additional force introducing ring.

Here, the measurement bearing is designed to perform a force measurement in the rolling bearing for detecting radial and axial loads.

In this way, a measurement bearing is created in which the sensor layers are arranged protected within the measurement bearing. Here, each force introducing ring acts, on one hand, as part of a housing for the respective sensor layer and, on the other hand, the respective force introducing ring defines an area in the rolling bearing in which amplified elongation occurs.

Rolling bearings with such integrated sensor layers are able to determine the forces acting on the rolling bearings and transmit these to an evaluation unit.

Preferably, the rolling bearings are cylinder roller bearings or grooved ball bearings or conical roller bearings or needle bearings, especially the axial variants of these bearings. In an especially preferred way, the rolling bearings are used in construction machines, cranes, crane flanges, wheel bearings, wheel-set bearings, industrial trucks, agricultural machines, or oil and gas handling deices.

The sensor layer preferably has at least one layer that can be produced using thin-film processes. In the thin-film processes, preferably thin layers of different materials, e.g., metallic, dielectric, or semiconductor materials are produced and processed. The thickness of such layers is typically in the area of a few micrometers up to a few nanometers. The layers preferably can be structured by means of different methods.

In an especially preferred way, the sensor layer is designed to detect certain physical or chemical properties, e.g., pressure, tension, bending, or strain, and/or the physical characteristics of its environment qualitatively or as measured parameters quantitatively. These parameters are preferably detected by means of physical or chemical effects and can be converted into an electrical signal that can be further processed.

In an especially preferred way, the sensor layer has strain sensors for measuring the strain in tensile, compressive, or bending tests. From the measured strain, forces, moments, or weight loads can be calculated. These results can be output with analog or digital signals.

In an embodiment not according to the invention, the measurement bearing has a cover plate and the rolling bearing has a rolling bearing cage, a housing plate, and a shaft washer, wherein, the rolling bearing cage is arranged between the housing plate and the shaft washer, wherein, the shaft washer or the cover plate is provided as the at least one additional component.

In this way, a strain set on the rolling bearing due to a force applied to the rolling bearing can be received by the sensor layer, measured, and then evaluated.

Preferably, in this embodiment not according to the invention, the force introducing ring is connected rigidly to the cover plate or the shaft washer. Preferably, the fixed connection is realized by means of welding, adhesive bonding, soldering, threaded connections, rivets, clips, or swaging.

This fixed connection prevents micro-movements and leads to an approximately hysteresis-free strain measurement, because almost no micro-movements occur on the fixed connection.

Preferably, the component provided with the sensor layer can be mounted with play or transition adaptation, without this having a disadvantageous effect on the measurement signal.

In another embodiment not according to the invention, the installation space is surrounded by the shaft washer, the force introducing ring, and a second force introducing ring and the cover plate, wherein at least one sensor layer is arranged on the cover plate or the shaft washer.

In this way, strain can be received by means of the sensor layer. Furthermore, protection of the sensor layer in the interior of the measurement bearing is provided.

Preferably, in the embodiment not according to the invention, the cover plate or the shaft washer is coated with the sensor layer, i.e., the sensor layer is applied to the cover plate or the shaft washer. In this way, strain can be detected along the cover plate or the shaft washer by means of the sensor layer and then evaluated.

In another embodiment not according to the invention, the installation space is surrounded by two cover plates and the force introducing ring and a second force introducing ring, wherein at least one sensor layer is arranged on at least one cover plate.

In this way, an alternative embodiment for receiving strain by means of the sensor layer is provided. Furthermore, protection of the sensor layer in the interior of the measurement bearing is also provided.

Preferably, in the embodiment not according to the invention, the at least one cover plate is coated with the sensor layer, i.e., the sensor layer is applied to the cover plate. In this way, strain can be detected along the at least one cover plate by means of the sensor layer and then evaluated.

In another embodiment not according to the invention, the installation space is surrounded by the cover plate and the force introducing ring, wherein the force introducing ring has a U-shaped cross section and at least one sensor layer is arranged on the cover plate or the force introducing ring.

In this way, another alternative embodiment for receiving strain by means of the sensor layer is provided. Furthermore, protection of the sensor layer in the interior of the measurement bearing is also provided.

Preferably, in an embodiment not according to the invention, the cover plate is coated with the sensor layer, i.e., the sensor layer is applied on the cover plate. In this way, strain can be detected along the cover plate by means of the sensor layer and then evaluated. By providing the force introducing ring with a U-shaped cross section, a second cover plate is no longer required.

According to the present invention, the rolling bearing has a rolling bearing cage, an outer ring, and an inner ring, wherein the rolling bearing cage with rolling bodies is arranged between the two rings, wherein the outer ring or the inner ring is provided as the at least one additional component of the measurement bearing.

In this way, a strain set on the rolling bearing due to a force acting on the rolling bearing can be detected by the sensor layer, measured, and then evaluated.

Here, the force introducing ring is arranged according to the invention either along the inner lateral surface of the inner ring, wherein the installation space is surrounded by the force introducing ring and the inner ring and at least one sensor layer is arranged on the inner ring or the force introducing ring.

In this way, strain can be received by the sensor layer. Furthermore, the sensor layer is protected in the interior of the measurement bearing. Advantageously, the force introducing ring is specifically suitable for detecting radial loads.

Preferably, the inner ring is coated with the sensor layer, i.e., the sensor layer is applied on the inner ring. In this way, strain can be detected along the inner ring by means of the sensor layer and then evaluated.

Alternatively, the force introducing ring is arranged according to the invention along the outer lateral surface of the outer ring, wherein the installation space is surrounded by the force introducing ring and the outer ring and at least one sensor layer is arranged on the outer ring or the force introducing ring.

In this way, an alternative embodiment for receiving strain by the sensor layer is provided. Furthermore, the sensor layer is also protected in the interior of the measurement bearing. Advantageously, the force introducing ring is specifically suitable for detecting radial loads.

Preferably, the outer ring is coated with the sensor layer, i.e., the sensor layer is applied on the outer ring. In this way, strain can be detected along the outer ring by means of the sensor layer and then evaluated.

According to the invention, an additional force introducing ring is arranged along a side edge of the outer ring, wherein an additional installation space is surrounded by the additional force introducing ring and the side edge of the outer ring and at least one additional sensor layer is arranged on the side edge of the outer ring or on the additional force introducing ring.

Advantageously, the additional force introducing ring is decisively suitable for detecting axial loads.

Preferably, the side edge is the end side of the outer ring. In an especially preferred way, the side edge is coated with the additional sensor layer, i.e., the additional sensor layer is applied on this edge. In this way, it is possible to receive and measure strain that is set in the axial direction relative to the rolling bearing.

Preferably, the rolling bearing is constructed as a grooved ball bearing.

Preferably, a sensor layer can be mounted with play or transition adaptation, without this having a disadvantageous effect on the measurement signal.

In another embodiment according to the invention, a channel is provided in an existing force introducing ring, wherein the channel is designed to lead the sensor lines that are connected to at least one of the sensor layers from the installation space out from the measurement bearing to an evaluation unit.

In this way, a simple possibility is created to lead the sensor lines out from the channel of the force introducing ring.

The evaluation unit is preferably designed to process and evaluate the measured values detected by the sensor layer.

In another embodiment according to the invention, the channel is designed to hold an element for anti-twist protection that engages in the channel. In this way, twisting between the cover plate and the housing plate or between one of these components and the housing is to be prevented.

BRIEF DESCRIPTION OF THE DRAWING

The invention is now shown by figures using examples. Shown herein are

DETAILED DESCRIPTION OF THE DRAWING

Figure 1:
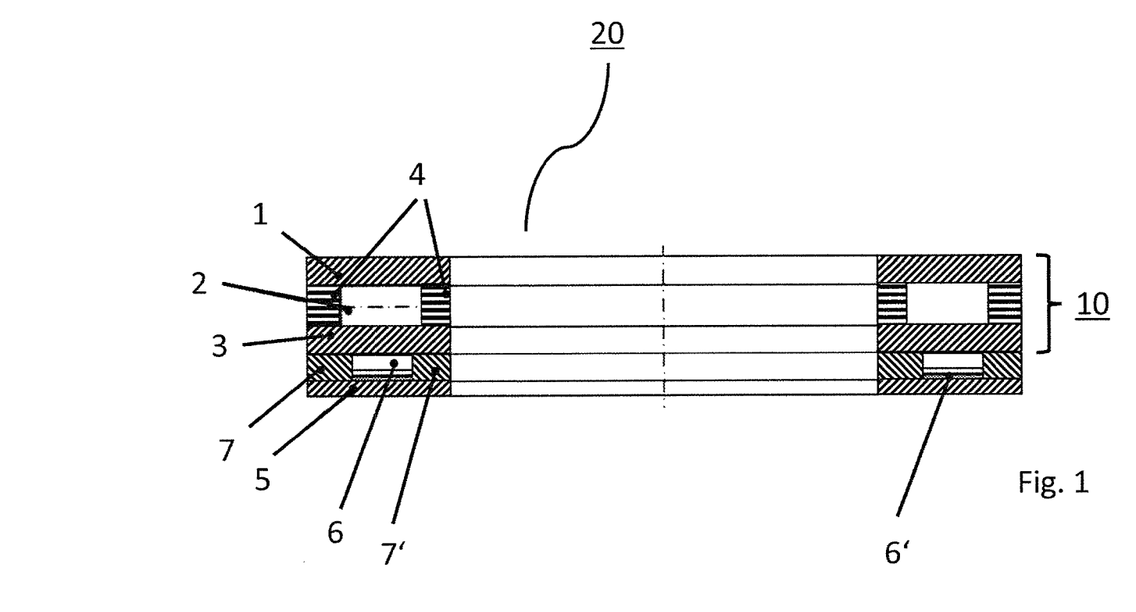
FIG. 1 a schematic view of a section through a measurement bearing not according to the invention, FIG. 2 a schematic view of a section through a chamber of the measurement bearing from FIG. 1, FIG. 3 a schematic view of a section through another alternative chamber of the measurement bearing from FIG. 1, FIG. 4 a schematic view of a section through another alternative chamber of the measurement bearing from FIG. 1, FIG. 5 a schematic view of a section through another measurement bearing not according to the invention, and FIG. 6 a schematic view of a section through another alternative measurement bearing from FIG. 5, and FIG. 7 a schematic view of a section through a measurement bearing according to the invention originating from the construction according to FIG. 5.

In FIG. 1, a schematic view of a section through a measurement bearing not according to the invention is shown.

The measurement bearing 20 has a rolling bearing 10. The rolling bearing 10 is constructed as an axial cylinder roller bearing. The rolling bearing 10 has a housing plate 1, rolling bodies 2, a shaft washer 3, and a rolling bearing cage 4. The housing plate 1, the rolling bodies 2, the shaft washer 3, and the rolling bearing cage 4 form the rolling bearing 10. The rolling bodies 2 are supported so that they can rotate in the rolling bearing cage 4. The rolling bearing cage 4 and the rolling bodies 2 are bounded by the housing plate 1 and the shaft washer 3.

Furthermore, the measurement bearing 20 has a chamber. The chamber has a cover plate 5, an installation space 6 for multiple sensor layers 6', and two force introducing rings 7 and 7'. The installation space 6 for the sensor layers 6' is arranged between the shaft washer 3 and the cover plate 5 and is bounded on two sides by the force introducing rings 7 and 7'.

The sensor layers 6' are applied on the cover plate 5 in the installation space 6.

After successful installation of the measurement bearing 20 in a device, the load is introduced via the force introducing rings into the shaft washer. Due to this load, strain occurs in the chamber, especially in the installation space 6 and on the force introducing rings 7 and 7', as well as the shaft ring 3. This strain can now be detected by means of the sensor layers 6' and transmitted to a corresponding device (not shown) for evaluation by means of sensor lines that are provided in a channel in the force introducing ring 7.

Figure 2:
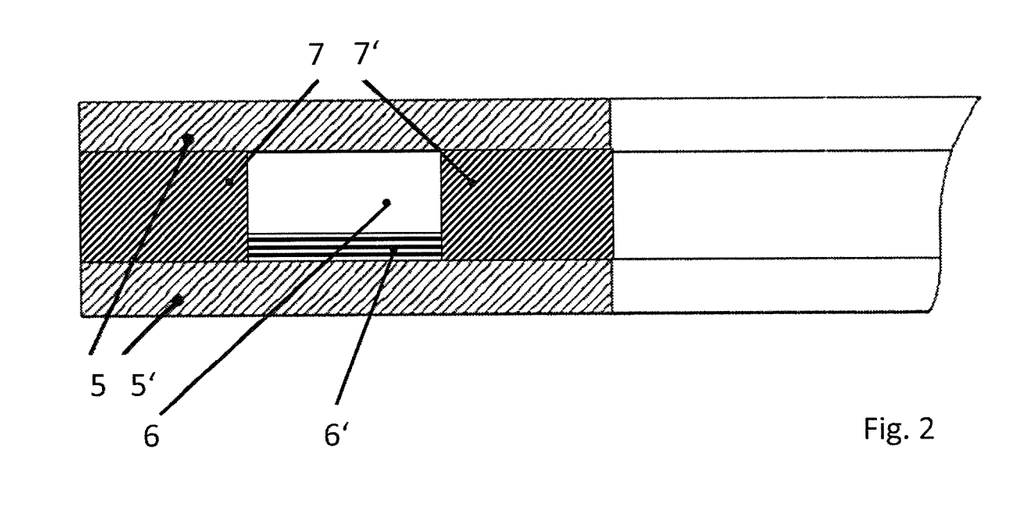

In FIG. 2, a schematic view of a section through a chamber of the measurement bearing from FIG. 1 is shown.

The rolling bearing (not shown) can have the same structure as already described under FIG. 1.

The chamber connects to the rolling bearing. The chamber has two cover plates 5 and 5', an installation space 6 for the sensor layers 6', and two force introducing rings 7 and 7'. The installation space 6 for the sensor layers 6' is arranged between the two cover plates 5 and 5' and is bounded on two sides by the force introducing rings 7 and 7'.

The installation space 6 has one or more sensor layers 6'. The sensor layers 6' are applied on the lower cover plate 5 in the installation space 6 at the farthest from the housing, but could also be applied on the opposite cover plate.

After successful installation of the measurement bearing 20 in a device, loads are guided via the walls of the chamber. Due to these loads, strain occurs in the chamber, especially in the installation space 6 and on the force introducing rings 7 and 7'. This strain can now be detected by means of the sensor layers 6'.

Figure 3:
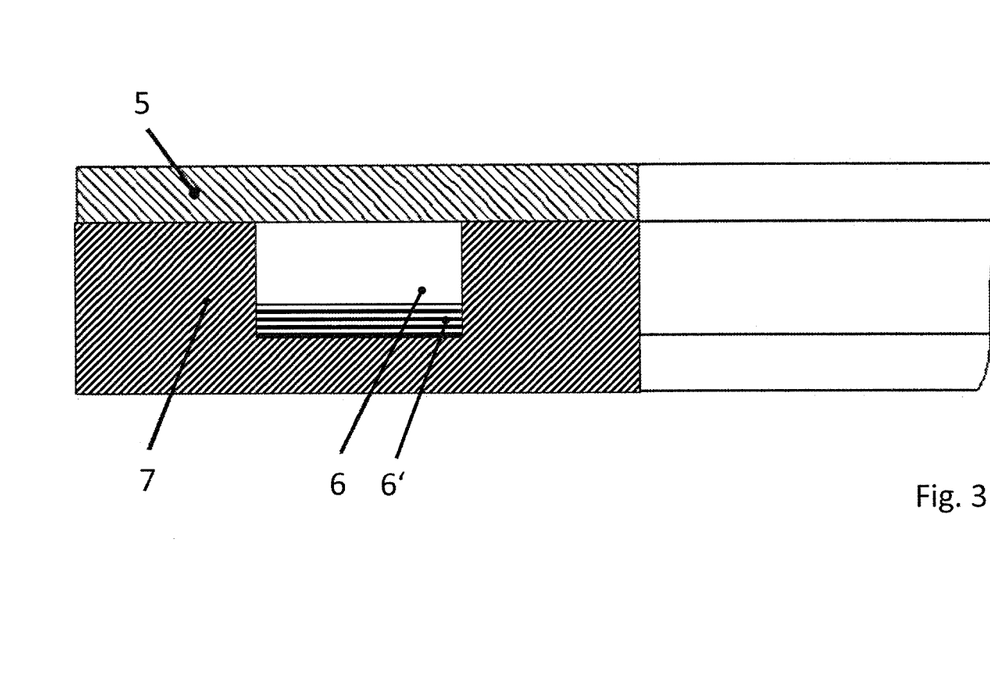

In FIG. 3, a schematic view of a section through another alternative chamber of the measurement bearing from FIG. 1 is shown.

The rolling bearing (not shown) can have the same structure as already described under FIG. 1.

The chamber connects to the rolling bearing. The chamber has a cover plate 5, an installation space 6 for the sensor layers 6', and a force introducing ring 7 with a U-shaped cross section. The installation space 6 for the sensor layers 6' is arranged between the cover plate 5 and the force introducing ring 7.

The installation space 6 has several sensor layers 6'. The sensor layers 6' are applied on the cover plate 5 in the installation space 6, but could also be applied on the cover plate 5.

In this way, the chamber can be positioned relative to the rolling bearing 10 so that either the cover plate 5 or the force introducing ring 7 points toward the rolling bearing 10.

After successful installation of the measurement bearing 20 in a device, the rolling bearing 10 presses on the chamber. Due to this pressure, strain occurs in the chamber, especially in the installation space 6 and on the force introducing ring 7 or the cover plate 5. This strain can now be detected by means of the sensor layers 6'.

Figure 4:
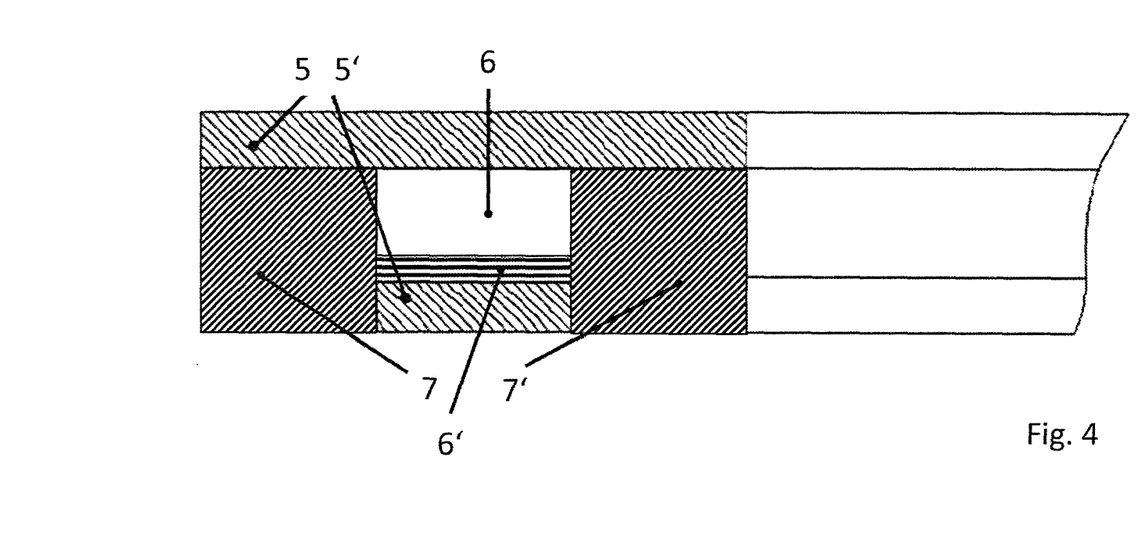

In FIG. 4, a schematic view of a section through another alternative chamber of the measurement bearing from FIG. 1 is shown.

The rolling bearing (not shown) can have the same structure as already described under FIG. 1.

The chamber connects to the rolling bearing. The chamber has two cover plates 5 and 5', an installation space 6 for the sensor layers 6', and two force introducing rings 7 and 7'. The installation space 6 for the sensor layers 6' is arranged between the two cover plates 5 and 5' and is bounded on two sides by the force introducing rings 7 and 7'. The lower cover plate 5 has a shorter design than the upper cover plate 5'.

The installation space 6 has one or more sensor layers 6'. The sensor layers 6' are applied on one of the cover plates 5 or 5' in the installation space 6 for the sensor layers 6'. In this way, the chamber can be positioned relative to the rolling bearing 10 so that either the cover plate 5 or 5' points toward the rolling bearing 10.

After successful installation of the measurement bearing 20 in a device, the rolling bearing 10 presses on the chamber. Due to this pressure, strain occurs in the chamber, especially in the installation space 6 and on the force introducing rings 7 and 7'. This strain can now be detected by means of the sensor layers 6'.

Figures 5, 6, 7:
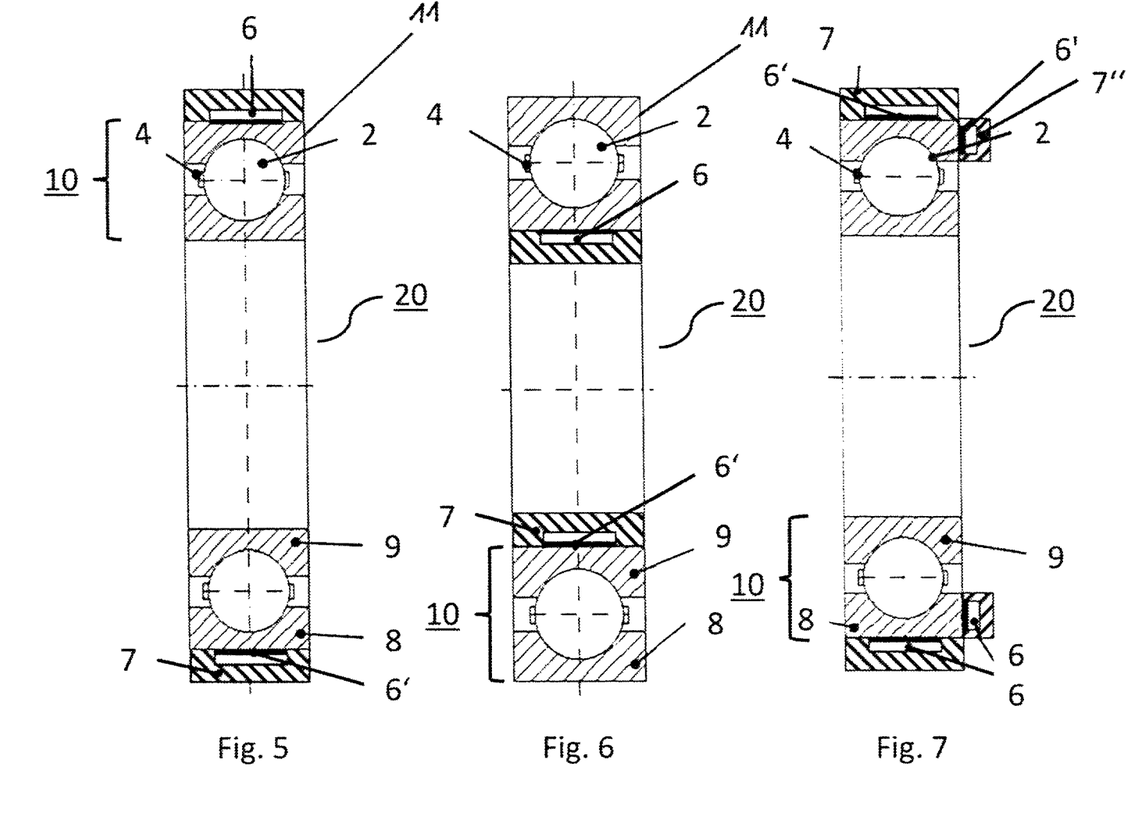

In FIG. 5, a schematic view of a section through another measurement bearing not according to the invention is shown.

The measurement bearing 20 has a rolling bearing 10. The rolling bearing 10 is constructed as a grooved ball bearing. The rolling bearing 10 has rolling bodies 2, a rolling bearing cage 4, an outer ring 8, and an inner ring 9.

The outer ring 8, the inner ring 9, the rolling bearing cage 4, and the rolling bodies 2 form the rolling bearing 10. The rolling bodies 2 are supported in the rolling bearing cage 4 so that they can rotate. The outer ring 8 and the inner ring 9 bound the rolling bearing cage 4 and the rolling bodies 2.

A chamber that is arranged on the outer lateral surface of the outer ring 8 connects to the rolling bearing 10. The chamber has the installation space 6 for the sensor layers 6' and a force introducing ring 7 with a U-shaped cross section. The installation space 6 for the sensor layers 6' is arranged between the outer ring 8 and the force introducing ring 7.

The installation space 6 has one or more sensor layers 6'. The sensor layers 6' are applied on the outer ring 8 or on the force introducing ring 7 in the installation space 6.

After successful installation of the measurement bearing 20 in a device, the rolling bearing 10 presses on the chamber. Due to this pressure, strain occurs in the chamber, especially in the installation space 6 and on the force introducing ring 7. This strain can now be detected by means of the sensor layers 6' and transmitted to a corresponding device (not shown) for evaluation by means of sensor lines that are provided in a channel in the force introducing ring 7.

In FIG. 6, a schematic view of a section through another alternative measurement bearing from FIG. 5 is shown.

The measurement bearing 20 has a rolling bearing 10. The rolling bearing 10 is constructed as a grooved ball bearing. The rolling bearing 10 has rolling bodies 2, a rolling bearing cage 4, an outer ring 8, and an inner ring 9.

The outer ring 8, the inner ring 9, the rolling bearing cage 4, and the rolling bodies 2 form the rolling bearing 10. The rolling bodies 2 are supported in the rolling bearing cage 4 so that they can rotate. The outer ring 8 and the inner ring 9 bound the rolling bearing cage 4 and the rolling bodies 2.

A chamber that is arranged on the inner lateral surface of the inner ring 9 connects to the rolling bearing 10. The chamber has the installation space 6 for the sensor layers 6' and a force introducing ring 7 with a U-shaped cross section. The installation space 6 for the sensor layers 6' is arranged between the outer ring 8 and the force introducing ring 7.

The installation space 6 has one or more sensor layers 6'. The sensor layers 6' are applied on the outer ring 8 or the force introducing ring 7 in the installation space 6.

After successful installation of the measurement bearing 20 in a device, the rolling bearing 10 presses on the chamber. Due to this pressure, strain occurs in the chamber, especially in the installation space 6 and on the force introducing ring 7. This strain can now be detected by means of the sensor layers 6'.

In FIG. 7, a schematic view of a section through another alternative measurement bearing according to the invention originating from the construction according to FIG. 5 is shown.

In contrast to FIG. 5, an additional chamber is provided in FIG. 7. The chamber extends along the round circular right side edge of the outer ring 8, that is, along the right end side 11 of the outer ring 8 (compare with FIG. 5).

The chamber has an additional installation space 6 for the sensor layers 6' and an additional force introducing ring 7" with a U-shaped cross section. The additional installation space 6 for the sensor layers 6' is arranged between the outer ring 8 and the additional force introducing ring 7".

Each installation space 6 has one or more sensor layers 6'. The sensor layers 6' are applied on the outer ring 8 or the force introducing rings 7, 7" in the installation space 6.

After successful installation of the measurement bearing 20 in a device, the rolling bearing 10 also presses on the additional chamber. Due to this pressure, strain occurs in the chambers, especially in the respective installation space 6 and on the respective force introducing ring 7, 7". This strain can now be detected by means of the sensor layers 6'. The force introducing ring 7 is decisively suitable for detecting radial loads. The force introducing ring 7" is decisively suitable for detecting axial loads.

In this way, a measurement bearing 20 can be created with a rolling bearing 10, in which the sensor layers are arranged protected within the measurement bearing 20 and this is also in the position, in addition to its ability to transfer loads, to determine the loads that occur without requiring additional maintenance on the rolling bearing 10 and allowing costs to be saved.

With the measurement bearing 20, the quality and functionality are increased, as well as the safety of systems and machines.

LIST OF REFERENCE NUMBERS

1 Housing plate
2 Rolling body
3 Shaft washer
4 Rolling bearing cage
5 Cover plate
5' Cover plate
6 Installation space
6' Sensor layer
7 Force introducing ring
7' Force introducing ring
7" Force introducing ring
8 Outer ring
9 Inner ring
10 Rolling bearing
11 Side edge (end side of the outer ring)
20 Measurement bearing

The invention claimed is:

1. A measurement bearing, comprising a rolling bearing, at least one force introducing ring and an installation space for at least one sensor layer, the installation space is surrounded by the at least one force introducing ring and at least one other adjacent component of the measurement bearing, the rolling bearing including a rolling bearing cage, an outer ring, and an inner ring, with the rolling bearing cage with rolling bodies being arranged between the outer ring and the inner ring, the outer ring or the inner ring is provided as the at least one other adjacent component, either the force introducing ring is arranged along an inner lateral surface of the inner ring, and the installation space is surrounded by the force introducing ring and the inner ring and the at least one sensor layer is arranged on the inner ring or the force introducing ring, or the force introducing ring is arranged along an outer lateral surface of the outer ring, and the installation space is surrounded by the force introducing ring and the outer ring, and the at least one sensor layer is arranged on the outer ring or the force introducing ring, and
    an additional force introducing ring is arranged along a side edge of the outer ring, and an additional installation space is surrounded by the additional force introducing ring and the side edge of the outer ring, and at least one additional sensor layer is arranged on the side edge of the outer ring or on the additional force introducing ring.

2. The measurement bearing according to claim 1, wherein the sensor layer has at least one layer formed as a thin film.

* * * * *